(12) United States Patent
Eom et al.

(10) Patent No.: US 8,892,436 B2
(45) Date of Patent: Nov. 18, 2014

(54) FRONT-END PROCESSOR FOR SPEECH RECOGNITION, AND SPEECH RECOGNIZING APPARATUS AND METHOD USING THE SAME

(75) Inventors: Ki-wan Eom, Hwaseong-si (KR); Chang-woo Han, Seoul (KR); Tae-gyoon Kang, Seoul (KR); Nam-soo Kim, Seoul (KR); Doo-hwa Hong, Goyang-si (KR); Jae-won Lee, Seoul (KR); Hyung-joon Lim, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 471 days.

(21) Appl. No.: 13/276,775

(22) Filed: Oct. 19, 2011

(65) Prior Publication Data

US 2012/0095762 A1    Apr. 19, 2012

Related U.S. Application Data

(60) Provisional application No. 61/394,475, filed on Oct. 19, 2010.

(30) Foreign Application Priority Data

Sep. 29, 2011    (KR) .................. 10-2011-0098935

(51) Int. Cl.

| | |
|---|---|
| *G10L 15/26* | (2006.01) |
| *G10L 19/12* | (2013.01) |
| *G10L 15/00* | (2013.01) |
| *G10L 15/06* | (2013.01) |
| *G10L 17/06* | (2013.01) |
| *G10L 13/00* | (2006.01) |
| *G10L 15/02* | (2006.01) |

(52) U.S. Cl.
CPC ..................... *G10L 15/02* (2013.01)
USPC .......... 704/235; 704/222; 704/236; 704/237; 704/240; 704/243; 704/244; 704/245; 704/246; 704/269

(58) Field of Classification Search
USPC ......... 704/222, 235, 236, 237, 240, 243, 244, 704/245, 246, 269
See application file for complete search history.

(56) References Cited

U.S. PATENT DOCUMENTS 5,787,394 A * 7/1998 Bahl et al. ...................... 704/238
5,793,891 A * 8/1998 Takahashi et al. ............. 382/228

(Continued)

OTHER PUBLICATIONS

Digalakis, V.; Rohlicek, J.R.; Ostendorf, M., "ML estimation of a stochastic linear system with the EM algorithm and its application to speech recognition," Speech and Audio Processing, IEEE Transactions on , vol. 1, No. 4, pp. 431,442, Oct. 1993.*

(Continued)

*Primary Examiner* — Edgar Guerra-Erazo
(74) *Attorney, Agent, or Firm* — Sughrue Mion, PLLC

(57) ABSTRACT

A method of recognizing speech is provided. The method includes the operations of (a) dividing first speech that is input to a speech recognizing apparatus into frames; (b) converting the frames of the first speech into frames of second speech by applying conversion rules to the divided frames, respectively; and (c) recognizing, by the speech recognizing apparatus, the frames of the second speech, wherein (b) comprises converting the frames of the first speech into the frames of the second speech by reflecting at least one frame from among the frames that are previously positioned with respect to a frame of the first speech.

30 Claims, 5 Drawing Sheets

(56) References Cited

U.S. PATENT DOCUMENTS

| | | | |
|---|---|---|---|
| 5,893,059 A * | 4/1999 | Raman | 704/256.2 |
| 5,995,927 A * | 11/1999 | Li | 704/246 |
| 6,073,096 A * | 6/2000 | Gao et al. | 704/245 |
| 6,125,345 A * | 9/2000 | Modi et al. | 704/240 |
| 6,324,502 B1 * | 11/2001 | Handel et al. | 704/226 |
| 6,567,776 B1 * | 5/2003 | Chang et al. | 704/236 |
| 6,591,146 B1 * | 7/2003 | Pavlovic et al. | 700/29 |
| 6,959,278 B1 * | 10/2005 | Shu et al. | 704/243 |
| 7,328,154 B2 * | 2/2008 | Mutel et al. | 704/245 |
| 7,418,383 B2 * | 8/2008 | Droppo et al. | 704/236 |
| 7,734,472 B2 * | 6/2010 | Walker | 704/278 |
| 7,769,582 B2 * | 8/2010 | Droppo et al. | 704/226 |
| 8,005,674 B2 * | 8/2011 | Janke et al. | 704/238 |
| 2003/0220791 A1 * | 11/2003 | Toyama | 704/256 |
| 2004/0260546 A1 * | 12/2004 | Seo et al. | 704/233 |

OTHER PUBLICATIONS

Nam Soo Kim; Woohyung Lim; Stern, R.M. "Feature compensation based on switching linear dynamic model", Signal Processing Letters, IEEE, on pp. 473-476 vol. 12, Issue: 6, Jun. 2005.*

Kim, Nam Soo et al., "Chapter 7: Statistical Model based Techniques for Robust Speech Communication" Recent Advances in Robust Speech Recognition technology, Bentham Science Publishers, 2010, pp. 114-132.

Acero, Alejandro, "Acoustical and Environmental Robustness in Automatic Speech Recognition", PhD Dissertation, Department of Electrical and Computer Engineering, Carnegie Mellon University, Pittsburgh, PA, 1990, 153 pages.

Droppo, Jasha et al., "Evaluation of the Splice Algorithm on the Auroral Database", Microsoft Research, 2001, 5 pages.

Buera, Luis et al., "Unsupervised Data-Driven Feature Vector Normalization With Acoustic Model Adaptation for Robust Speech Recognition", IEEE Transaction on Audio, Speech, and Language Processing, vol. 18, No. 2, Feb. 2010, pp. 296-309.

Kim, Nam Soo et al., "Feature Compensation Based on Switching Linear Dynamic Model", IEEE Signal Processing Letters, vol. 12, No. 6, Jun. 2005, pp. 473-476.

Wolfel, Matthias, "Enhanced Speech Features by Single-Channel Joint Compensation of Noise and Reverberation", IEEE Transactions on Audio, Speech, and Language Processing, vol. 17, No. 2, Feb. 2009. pp. 312-323.

* cited by examiner

|  | FIRST METHOD | SECOND METHOD | THIRD METHOD |
|---|---|---|---|
| RECOGNITION RATE(%) | 90.12 | 85.50 | 91.03 |

FRONT-END PROCESSOR FOR SPEECH RECOGNITION, AND SPEECH RECOGNIZING APPARATUS AND METHOD USING THE SAME

CROSS-REFERENCE TO RELATED PATENT APPLICATION

This application claims the benefit of U.S. Provisional Patent Application No. 61/394,475, filed on Oct. 19, 2010, in the U.S. Patent and Trademark Office, and priority from Korean Patent Application No. 10-2011-0098935, filed on Sep. 29, 2011, in the Korean Intellectual Property Office, the disclosures of which are incorporated herein by reference in their entireties.

BACKGROUND OF THE INVENTION

1. Field of the Invention

Apparatuses and methods consistent with exemplary embodiments relate to a front-end processor for speech recognition, and a speech recognizing apparatus and method using the front-end processor, and more particularly, to a speech recognizing apparatus and method that involve recognizing speech by converting input speech through the use of a linear dynamic system.

2. Description of the Related Art

General speech recognizing apparatuses store an acoustic model that has learned from speech recorded by using high quality equipment in a favorable environment. In particular, a favorable environment indicates an environment in which noise, reverberation, and distortion due to a recording device do not exist, thereby providing for a high likelihood of voice recognition. When speech spoken by a speaker is input to a speech recognizing apparatus, the speech recognizing apparatus compares the input speech with an acoustic model, and then recognizes the input speech.

However, speech spoken in a specific condition has many noises and distortions due to a function of a device, environmental factors (ambient noise, reverberation, or the like), and the like. Thus, a recognition rate of the speech recognizing apparatus may deteriorate with respect to the speech spoken in the specific condition. That is, the recognition rate of the speech recognizing apparatus deteriorates due to a difference between an environment in which speech for generation of an acoustic model is recorded (hereinafter, referred to as "basic environment") and an environment in which a speech of a speaker is recorded for speech recognition (hereinafter, referred to as "test environment").

SUMMARY OF THE INVENTION

According to an aspect of an exemplary embodiment, there is provided a front-end processor, and a speech recognizing apparatus and method using the front-end processor, that increases a recognition rate of the speech recognizing apparatus by converting speech spoken in a test environment by using a linear dynamic system. Hereinafter, it is understood that the terms "speech recognition" and "voice recognition" have identical meanings and may be used interchangeably.

There is also provided an apparatus and method of increasing a recognition rate of a speech recognizing apparatus by performing feature vector-sequence to feature vector-sequence conversion on speech spoken in a test environment.

According to an aspect of an exemplary embodiment, there is provided a method of recognizing speech, the method including (a) dividing first speech that is input to a speech recognizing apparatus into frames; (b) converting the frames of the first speech into frames of second speech by applying conversion rules to the divided frames, respectively; and (c) by the speech recognizing apparatus recognizing the frames of the second speech, wherein the converting (b) includes an operation of converting the frames of the first speech into the frames of the second speech by reflecting at least one frame from among the frames that are previously positioned with respect to a frame of the first speech.

The frames of the first speech and the second speech may include feature values indicating speech signals included in the frames.

The converting (b) may include (b-1) clustering the frames of the first speech into a plurality of groups; (b-2) converting the frames of the first speech into the frames of the second speech by applying the conversion rules to the plurality of groups, wherein the conversion rules correspond to the plurality of groups, respectively; and (b-3) combining the frames of the second speech.

The clustering (b-1) may be performed by using a Vector Quantization (VQ)-based clustering method or by using a Gaussian Mixture Model (GMM)-based clustering method.

The first speech may correspond to a voice recognition likelihood that is less than voice recognition likelihood of the second speech.

The conversion rules may be decided in a relation between first speech data that is input to the speech recognizing apparatus, and second speech data that corresponds to a voice recognition likelihood greater than the voice recognition likelihood corresponding to the first speech data.

The method may further include (d) deciding the conversion rules, wherein the deciding (d) includes at least one of (d-1) dividing the first speech data and the second speech data into the frames; (d-2) setting a first conversion rule as a random value, wherein the first conversion rule indicates a correlation between the frames of the first speech data and the frames of the second speech data; (d-3) deriving a first variable value that has an effect on a second conversion rule indicating a correlation between the frames of the first speech data and the frames of the second speech data, based on the frames of the first speech data and the second speech data and the first conversion rule; (d-4) deciding, or determining, the second conversion rule by using the first variable value; (d-5) deriving a second variable value that has an effect on a third conversion rule indicating a correlation between the frames of the first speech data and the frames of the second speech data, based on the frames of the first speech data and the second speech data and the second conversion rule; (d-6) deciding, or determining, the third conversion rule by using the second variable value; and (d-7) deciding, or determining, the conversion rules by repeating (d-5) and (d-6) until a value of an nth conversion rule indicating a correlation between the frames of the first speech data and the frames of the second speech data is converged.

The method may further include (k) clustering the frames of the first speech data and the frames of the second speech data into a plurality of groups; and (i) deciding, or determining, the conversion rules corresponding to the plurality of groups, respectively, by performing at least one of (d-2) through (d-7) on each of the plurality of groups.

The deriving (d-3) and the deriving (d-5) may be performed via Kalman filtering that corresponds to an expectation stage in an Expectation Maximization (EM) algorithm.

The deciding (d-4) and the deciding (d-6) may correspond to a maximization stage in an EM algorithm and may be performed to maximize likelihood.

According to an aspect of another exemplary embodiment, there is provided a speech recognizing apparatus including a speech input unit for receiving first speech and dividing the first speech into frames; a speech converting unit for converting the frames of the first speech into frames of second speech by applying conversion rules to the divided frames, respectively; and a recognizing unit for recognizing the frames of the second speech, wherein the speech converting unit converts the frames of the first speech into the frames of the second speech by reflecting at least one frame from among the frames that are previously positioned with respect to a frame of the first speech.

The frames of the first speech and the second speech may include feature values indicating speech signals included in the frames.

The speech recognizing apparatus may further include a clustering unit for clustering the frames of the first speech into a plurality of groups, and the speech converting unit may convert the frames of the first speech into the frames of the second speech by applying the conversion rules to the plurality of groups. The speech converting unit may combine the frames of the second speech, wherein the conversion rules correspond to the plurality of groups, respectively.

The clustering unit may cluster the frames of the first speech by using a Vector Quantization (VQ)-based clustering method or a Gaussian Mixture Model (GMM)-based clustering method.

The first speech may correspond to a voice recognition likelihood that is less than a voice recognition likelihood corresponding to the second speech.

The speech recognizing apparatus may further include a conversion rule determining unit for deciding the conversion rules in a relation between first speech data and second speech data that corresponds to a voice recognition likelihood greater than a voice recognition likelihood corresponding to the first speech data.

The conversion rule determining unit may decide, or determine, the conversion rules by performing (a) dividing the first speech data and the second speech data into frames; (b) setting a first conversion rule as a random value, wherein the first conversion rule indicates a correlation between the frames of the first speech data and the frames of the second speech data; (c) deriving a first variable value that has an effect on a second conversion rule indicating a correlation between the frames of the first speech data and the frames of the second speech data, based on the frames of the first speech data and the second speech data and the first conversion rule; (d) deciding, or determining, the second conversion rule by using the first variable value; (e) deriving a second variable value that has an effect on a third conversion rule indicating a correlation between the frames of the first speech data and the frames of the second speech data, based on the frames of the first speech data and the second speech data and the second conversion rule; (f) deciding, or determining, the third conversion rule by using the second variable value; and (g) deciding, or determining, the conversion rules by repeating (e) and (f) until a value of an nth conversion rule indicating a correlation between the frames of the first speech data and the frames of the second speech data is converged.

The speech recognizing apparatus may further include a clustering unit for clustering the frames of the first speech data and the frames of the second speech data into a plurality of groups, and the conversion rule determining unit may decide the conversion rules corresponding to the plurality of groups, respectively, by performing the setting (b) through the deciding (g) on each of the plurality of groups.

The deriving (c) and the deriving (e) may be performed via Kalman filtering that corresponds to an expectation stage in an Expectation Maximization (EM) algorithm.

The deciding (d) and the deciding (f) may correspond to a maximization stage in an EM algorithm and may be performed to maximize likelihood.

According to an aspect of yet another exemplary embodiment, there is provided a front-end processor for speech recognition, the front-end processor including a speech input unit for receiving first speech and dividing the first speech into frames; and a speech converting unit for converting the frames of the first speech into frames of second speech by applying conversion rules to the divided frames, respectively; and wherein the speech converting unit converts the frames of the first speech into the frames of the second speech by reflecting at least one frame from among the frames that are previously positioned with respect to a frame of the first speech.

BRIEF DESCRIPTION OF THE DRAWINGS

The above and other features and advantages of the present inventive concept will become more apparent by describing in detail exemplary embodiments thereof with reference to the attached drawings in which.

DETAILED DESCRIPTION OF THE INVENTION

Hereinafter, the exemplary embodiments will be described in detail with reference to the attached drawings. In the following description, well-known functions or constructions are not described in detail since they would obscure the disclosure with unnecessary detail.

Expressions such as "at least one of," when preceding a list of elements, modify the entire list of elements and do not modify the individual elements of the list.

A feature conversion technique that is used in a speech recognizing apparatus increases a recognition rate of the speech recognizing apparatus by converting speech recorded in a test environment into speech recorded in a basic environment by removing noise and distortion of the speech recorded in the test environment. That is, the feature conversion technique increases the recognition rate of the speech recognizing apparatus by similarly changing speech, which is input to the speech recognizing apparatus, to speech (hereinafter, referred to as "reference speech") that is used to generate an acoustic model of the speech recognizing apparatus.

Figure 1:
FIG. 1 is a diagram that describes a feature conversion technique used in a speech recognizing apparatus.

FIG. 1 is a diagram that describes a feature conversion technique.

Referring to FIG. 1, it is possible to see that speech $X(=x_1, x_2, \ldots, x_T)$ recorded in a test environment is input into a feature conversion module, and converted speech $Y(=y_1, y_2, \ldots, y_T)$ is output from the feature conversion module. The input speech X is divided into predetermined frames, and feature values $x_1, x_2, \ldots, x_T$ that indicate speech signals included in the predetermined frames are converted into feature values $y_1, y_2, \ldots, y_T$ that indicate speech signals included in frames of the output speech Y. Here, each feature value may include a feature vector of a speech signal for each frame. A speech recognizing apparatus may increase a recognition rate by using the speech Y.

According to a stereo data-based method among feature conversion techniques, speech spoken by a specific speaker with respect to the same sentence is simultaneously recorded in a basic environment and a test environment, respectively, a conversion rule regarding conversion between the recorded speech is generated, and then the speech recorded in the test environment is converted by using the conversion rule.

In one or more exemplary embodiments, the fact that the speech recognizing apparatus "recognizes" speech means that the speech recognizing apparatus identifies a linguistic meaning of the speech.

Figure 2:
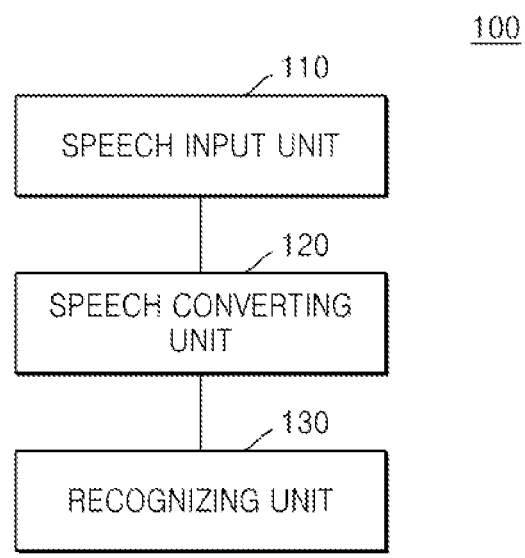
FIG. 2 is a block diagram illustrating a configuration of a speech recognizing apparatus according to an exemplary embodiment.

FIG. 2 is a block diagram illustrating a configuration of a speech recognizing apparatus 100 according to an exemplary embodiment according to the present inventive concept.

Figure 3:
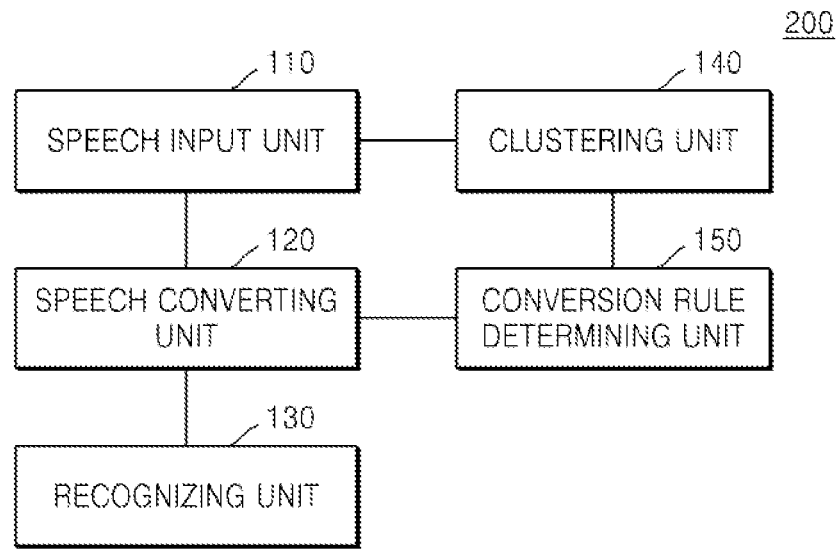
FIG. 3 is a block diagram illustrating a configuration of a speech recognizing apparatus according to another exemplary embodiment.

Referring to FIG. 2, the speech recognizing apparatus 100 includes a speech input unit 110, a speech converting unit 120, and a recognizing unit 130. Also, as illustrated in FIG. 3, a speech recognizing apparatus 200 according to another exemplary embodiment may further include a clustering unit 140 and/or a conversion rule determining unit 150, in addition to the speech input unit 110, the speech converting unit 120, and the recognizing unit 130, as compared to the speech recognizing apparatus 100 of FIG. 2.

The speech input unit 110 receives first speech spoken by a speaker, and divides the first speech into predetermined frames.

The speech input unit 110 divides the first speech into frames corresponding to predetermined temporal units. Each of the frames may include a speech signal, or a feature vector having a feature value that indicates a feature of the speech signal.

The speech converting unit 120 converts the first speech into second speech by applying a conversion rule to each of the divided frames of the first speech. The speech converting unit 120 removes noise and distortion of the first speech and thus generates the second speech having a similar feature to a reference speech. In particular, the conversion rule may be characterized by specific parameters.

In one or more exemplary embodiments according to the present inventive concept, the fact that a frame is converted means that a speech signal of the frame, or a feature vector indicating a feature of the speech signal of the frame, is converted.

In the speech recognizing apparatus 100, when the speech converting unit 120 converts the frames of the first speech, the speech converting unit 120 reflects the frames, which are previously positioned with respect to a frame of the first speech, to the frame of the first speech, and then converts the frame of the first speech into a frame of the second speech. That is, the speech converting unit 120 converts speech, in consideration of a previous input.

In more detail, if the first speech is divided into a first frame through an nth frame, wherein the first frame is first positioned and the nth frame is last positioned, then when a fifth frame is converted, a speech signal corresponding to the fifth frame is converted in consideration of a speech signal corresponding to at least one of the first through fourth frames. That is, conversion may be performed according to feature vector-sequence to feature vector-sequence conversion, not feature vector to feature vector conversion.

In a case where reverberation exists in the first speech, the speech signal of the first frame may have an effect on frames after the first frame. In this case, if feature vector to feature vector conversion is performed, although the conversion rule would be applied to the second frame, the first speech would not be converted into a speech signal of the second speech which has the same meaning.

Thus, in a speech generating method according to an exemplary embodiment, when the nth frame of the first speech is converted, the conversion may be performed in consideration of at least one speech signal of the first through $(n-1)^{th}$ frames. By doing so, although reverberation, noise, or distortion exists in the first speech, the speech signal of the first frame may be stably converted.

The recognizing unit 130 recognizes frames of the converted second speech. The recognizing unit 130 identifies a linguistic meaning of the second speech by comparing the converted second speech with the acoustic model.

The speech recognizing apparatus 200 may further include the clustering unit 140.

The clustering unit 140 clusters the divided frames of the first speech into a plurality of groups. The clustering is performed to group frames that have a similar feature and that are from among the frames of the first speech, and then to apply a conversion rule appropriate for a feature of each of the groups.

The clustering unit 140 of the speech recognizing apparatus 200 may cluster the frames of the first speech by using a Vector Quantization (VQ)-based clustering method or a Gaussian Mixture Model (GMM)-based clustering method.

The VQ-based clustering method involves clustering a given sample data gathering into a plurality of groups in a vector space.

The GMM-based clustering method is a density assuming method obtained by revising a method of modeling distribution density of a given sample data gathering by using only one probability density function (PDF). In this regard, according to the GMM-based clustering method, a sample of data is modeled by using a plurality of Gaussian PDFs.

The speech recognizing apparatus 200 may further include the conversion rule determining unit 150.

The conversion rule determining unit 150 determines a conversion rule in a relation between first speech data and second speech data that has noise and distortion less than those of the first speech data.

Also, the first speech may include a signal corresponding to a voice recognition likelihood less than that corresponding to the second speech. In more detail, when the first speech and the second speech have the same amount of data, the first speech includes noise and distortion greater than those of the second speech.

In particular, voice recognition likelihood is the probability of a case in which, when speech is provided, a feature vector of the speech belongs to an acoustic model generated by a reference speech. That is, when it is assumed that the feature vector of the speech input to the speech recognizing apparatus is x, and the acoustic model is m, the corresponding voice recognition likelihood is given by $p(x|m)$.

The conversion rule determining unit 150 may be included in the speech recognizing apparatus 200, or may be externally arranged outside the speech recognizing apparatus 200 and then may transmit a conversion rule to the speech recognizing apparatus 200.

The conversion rule determining unit 150 may store a model that has been previously trained with respect to the first speech data and the second speech data. The model may be directly stored in the conversion rule determining unit 150 or may be transmitted from an external server. Also, the conversion rule determining unit 150 may directly train the first speech data and the second speech data and then may store a model.

The first speech data and the second speech data may include speech that is spoken by using the same text. Also, the first speech data may be the speech that is recorded in the same test environment as the first speech, and the second speech data may be the speech that is recorded in the same environment as the reference speech of the speech recognizing apparatus. For example, speech that is spoken by a specific speaker while reading a text may be simultaneously recorded by using a microphone used to record the reference speech and by using a microphone of the speech recognizing apparatus 100 which has an inferior performance than the microphone for the reference speech, so that the first speech data and the second speech data may be generated.

That is, the conversion rule determined between the first speech data and the second speech data is applied to the first speech input to the speech recognizing apparatus 100, so that the second speech that is similar to the reference speech of the speech recognizing apparatus 100 is generated.

Next, a method of generating the conversion rule indicating the relation between the first speech data and the second speech data will now be described in accordance with exemplary embodiments of the present inventive concept.

First, in operation (a), the first speech data and the second speech data are divided into predetermined frames. Next, in operation (b), a first conversion rule indicating a correlation between the frames of the first speech data and the frames of the second speech data is set as a random value.

Next, in operation (c), a first variable value that has an effect on a second conversion rule indicating a correlation between the frames of the first speech data and the frames of the second speech data is derived based on the first conversion rule and the frames of the first and second speech data.

Next, in operation (d), the second conversion rule is determined by using the first variable value. In operation (e), a second variable value that has an effect on a third conversion rule indicating a correlation between the frames of the first speech data and the frames of the second speech data is derived based on the second conversion rule and the frames of the first and second speech data. Then, in operation (f), the third conversion rule is determined by using the second variable value.

Next, in operation (g), operations (e) and (f) are repeated until a value of an nth conversion rule indicating a correlation between the frames of the first speech data and the frames of the second speech data is converged. The converged nth conversion rule is determined as a conversion rule between the first speech data and the second speech data.

In the speech recognizing apparatus 100, a method of deriving the first and second variable values may be performed via Kalman filtering that is an expectation stage in an Expectation Maximization (EM) algorithm. Also, in the speech recognizing apparatus 100, a method of determining the second and third conversion rules may be a maximization stage in the EM algorithm and may be performed to maximize the likelihood.

The Kalman filtering includes an algorithm that is used to estimate a new result by removing noise included in data by using previous measurement data and new measurement data, and the EM algorithm is executed to obtain maximum likelihood or maximum posterior probability likelihood when non-observational variables are included in a probability model. These algorithms are well known to one of ordinary skill in the art so that the detailed descriptions thereof are omitted herein.

As described above, the speech recognizing apparatus 200 may cluster the divided frames of the first speech into a plurality of groups, and may apply conversion rules corresponding to the plurality of groups, respectively.

In order to determine the conversion rules corresponding to the plurality of groups, respectively, first, the clustering unit 140 clusters the frames of the first speech data and the frames of the second speech data into a plurality of groups. Next, the conversion rule determining unit 150 may perform operations (b) through (g) on each of the plurality of groups and thus may determine the conversion rules corresponding to the plurality of groups, respectively.

Next, a method performed by the speech recognizing apparatus 100 so as to convert the first speech into the second speech will be mathematically described.

Here, the first speech is referred to as X, and the second speech is referred to as Y. When X and Y are divided into predetermined frames and then a feature vector of each frame is extracted, it is possible to obtain $X=(x_1, x_2, \ldots, x_T)$ and $Y=(y_1, y_2, \ldots, y_T)$. When it is assumed that an input is $x_t$ and an output is $y_t$, and a previous value of $x_t$ is considered in a relation between $x_t$ and $y_t$, the relationship equation below is formed. Here, $z_t$ is a function indicating the previous value of $x_t$.

$$z_{t+1}=A^{(k)}z_t+B^{(k)}x_t+u_t^{(k)}$$

$$y_t=C^{(k)}z_t+D^{(k)}x_t+w_t^{(k)}$$

where, A(k), B(k), C(k) and D(k) are $d_z \times d_z$, $d_z \times d_x$, $d_y \times d_z$, and $d_y \times d_z$ dimensional matrixes, respectively, and $z_t$ is a $d_z$-dimensional vector. $u_t^{(k)}$ and $w_t^{(k)}$ are random vectors of the Gaussian distribution and are as below.

$$u_t^{(k)} \sim N(\mu_u^{(k)}, Q^{(k)})$$

$$w_t^{(k)} \sim N(\mu_w^{(k)}, R^{(k)})$$

where, $(\mu, \Sigma)$ is a Gaussian PDF having a random vector $\mu$ and a covariance matrix $\Sigma$. $\Sigma$ includes $Q^{(k)}$ and $R^{(k)}$.

When a conversion rule is given as $\lambda^{(k)}=\{A^{(k)}, B^{(k)}, \mu^{u(k)}, C^{(k)}, D^{(k)}, \mu_w^{(k)}, Q^{(k)}, R^{(k)}\}$, the second speech Y with respect to the first speech X conforms to Equation 1 below.

$$z_{t+1}=A^{(k)}z_t+B^{(k)}x_t+\mu_u^{(k)}$$

$$y_t=C^{(k)}z_t+D^{(k)}x_t+\mu_w^{(k)} \qquad \text{Equation 1}$$

When a feature vector $x_t$ of the first speech is converted into $y_t$, a variable $z_t$ is reflected, and since $z_t$ is the previous value of $x_t$, thus, when a frame of the first speech is converted in the speech recognizing apparatus 100, a frame of the second speech is generated by reflecting a frame that is previously positioned with respect to the corresponding frame.

In a case where the frames of the first speech are clustered into a plurality of groups, it is required to combine frames of the second speech which are generated from the plurality of groups.

In a case where the speech recognizing apparatus 100 performs the clustering by using the GMM-based clustering method, posterior probabilities $p(k|x_t)$ may be calculated so that soft decision is applied thereto. Next, feature vectors of the frames of the second speech may be combined in a following manner, as shown below in Equation 2.

$$z_{t+1} = \sum_{k=1}^{K} p(k \mid x_t)[A^{(k)}z_t + B^{(k)}x_t + \mu_u^{(k)}]$$

$$y_t = \sum_{k=1}^{K} p(k \mid x_t)[C^{(k)}z_t + D^{(k)}x_t + \mu_w^{(k)}]$$

Equation 2

Next, a method of deciding a conversion rule between the first speech data and the second speech data in accordance with exemplary embodiments of the present inventive concept will be mathematically described.

When the first speech data is referred to as X and the second speech data is referred to as Y, and the first speech data and the second speech data are divided into frames, the same relationship equation as Equation 1 is formed.

First, a first conversion rule between the frames of the first speech data and the frames of the second speech data is randomly set.

Next, a first variable $z_1$ is calculated by using Equation 3, shown below, according to Kalman filtering.

$$\hat{z}_t = E[z_t | X, Y, \bar{\lambda}]$$

$$\widehat{z_t \hat{z}_t'} = E[z_t z_t' | X, Y, \bar{\lambda}]$$

$$\widehat{z_t \hat{z}_{t+1}'} = E[z_t z_{t+1}' | X, Y, \bar{\lambda}]$$

Equation 3

Next, by using $z_1$ and a feature vector of the frames, a second conversion rule is decided to maximize similarity according to the EM algorithm shown below as Equation 4.

$$\hat{\lambda} = \underset{\lambda}{\mathrm{argmax}}\, \Phi(\lambda, \bar{\lambda})$$

$$= \underset{\lambda}{\mathrm{argmax}} \int L(X, Y, Z \mid \lambda) p(Z \mid X, Y, \bar{\lambda}) dZ$$

Equation 4

Here, $L(X, Y, Z|\lambda)$ are expressed as shown below.

$$L(X, Y, Z, \lambda) = -\sum_{t=1}^{T-1} (z_{t+1} - A^{(k_t)}z_t - B^{(k_t)}x_t - \mu_u^{(k_t)})' [Q^{(k_t)}]^{-1}$$

$$(z_{t+1} - A^{(k_t)}z_t - B^{(k_t)}x_t - \mu_u^{(k_t)}) -$$

$$\sum_{t=1}^{T-1} (y_t - C^{(k_t)}z_t - D^{(k_t)}x_t - \mu_w^{(k_t)})' [R^{(k_t)}]^{-1} (y_t - C^{(k_t)}z_t - D^{(k_t)}x_t - \mu_w^{(k_t)}) -$$

$$\sum_{t=1}^{T-1} \log|Q^{(k_t)}| - \sum_{t=1}^{T} \log|R^{(k_t)}| + \mathrm{Constant.}$$

Also, $\bar{\lambda}$ is the second conversion rule that is an updated conversion rule, and $\bar{\lambda}$ is the first conversion rule that is a current conversion rule, $p(Z|X,Y,\bar{\lambda})$ is a posterior PDF of the first variable which is derived via Kalman filtering.

Maximization of an auxiliary function $\psi(\lambda, \bar{\lambda})$ may be possible by satisfying Equation 5 below via differentiation.

$$\left. \frac{\partial}{\partial \lambda} \Phi(\lambda, \bar{\lambda}) \right|_{\lambda=\hat{\lambda}} = 0$$

Equation 5

The solutions with respect to Equation 5 are expressed as shown below in Equations 6, 7, 8, and 9.

$$\begin{bmatrix} \left(\sum_{t=1}^{T-1} \widehat{z_t z_t'}\right) & \left(\sum_{t=1}^{T-1} \hat{z}_t x_t'\right) & \left(\sum_{t=1}^{T-1} \hat{z}_t\right) \\ \left(\sum_{t=1}^{T-1} x_t \hat{z}_t'\right) & \left(\sum_{t=1}^{T-1} x_t x_t'\right) & \left(\sum_{t=1}^{T-1} x_t\right) \\ \left(\sum_{t=1}^{T-1} \hat{z}_t'\right) & \left(\sum_{t=1}^{T-1} x_t'\right) & (T-1) \end{bmatrix} \begin{bmatrix} \hat{A}' \\ \hat{B}' \\ \hat{\mu}_u' \end{bmatrix} = \begin{bmatrix} \left(\sum_{t=1}^{T-1} \widehat{z_t z_{t+1}'}\right) \\ \left(\sum_{t=1}^{T-1} x_t \hat{z}_{t+1}'\right) \\ \left(\sum_{t=1}^{T-1} \hat{z}_{t+1}'\right) \end{bmatrix}$$

Equation 6

$$\begin{bmatrix} \left(\sum_{t=1}^{T} \widehat{z_t z_t'}\right) & \left(\sum_{t=1}^{T} \hat{z}_t x_t'\right) & \left(\sum_{t=1}^{T} \hat{z}_t\right) \\ \left(\sum_{t=1}^{T} x_t \hat{z}_t'\right) & \left(\sum_{t=1}^{T} x_t x_t'\right) & \left(\sum_{t=1}^{T} x_t\right) \\ \left(\sum_{t=1}^{T} \hat{z}_t'\right) & \left(\sum_{t=1}^{T} x_t'\right) & (T) \end{bmatrix} \begin{bmatrix} \hat{C}' \\ \hat{D}' \\ \hat{\mu}_w' \end{bmatrix} = \begin{bmatrix} \left(\sum_{t=1}^{T} \hat{z}_t y_t'\right) \\ \left(\sum_{t=1}^{T} x_t y_t'\right) \\ \left(\sum_{t=1}^{T} y_t'\right) \end{bmatrix}$$

Equation 7

$$\hat{Q} = \frac{1}{T-1} \sum_{t=1}^{T-1} E\left[(z_{t+1} - \hat{A}z_t - \hat{B}x_t - \hat{\mu}_u)(z_{t+1} - \hat{A}z_t - \hat{B}x_t - \hat{\mu}_u)' \mid X, Y, \bar{\lambda}\right]$$

Equation 8

$$\hat{R} = \frac{1}{T} \sum_{t=1}^{T} E\left[(y_t - \hat{C}z_t - \hat{D}x_t - \hat{\mu}_w)(y_t - \hat{C}z_t - \hat{D}x_t - \hat{\mu}_w)' \mid X, Y, \bar{\lambda}\right]$$

Equation 9

Here, $\hat{\lambda}\{\hat{A}, \hat{B}, \hat{\mu}_u, \hat{C}, \hat{D}, \hat{\mu}_w, \hat{Q}, \hat{R}\}$ is the updated conversion rule, that is, the second conversion rule.

A second variable value is calculated by using Equation 3 by using the second conversion rule and the feature vector of the frames, and then the second variable value is substituted for Equations 6, 7, 8, and 9, so that a third conversion rule is decided. In this manner, by repeatedly calculating conversion rules, when a value of an nth conversion rule is converged, the nth conversion rule is decided as a conversion rule between the first speech data and the second speech data.

Figure 4:
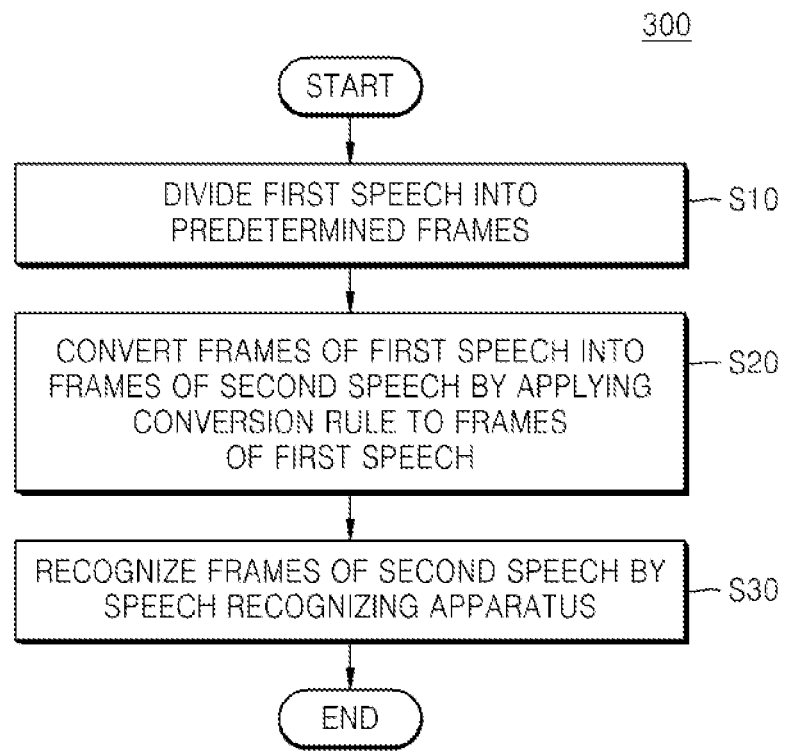
FIG. 4 is a flowchart illustrating a method of recognizing speech, according to an exemplary embodiment.

FIG. 4 is a flowchart illustrating a method 300 of recognizing speech, according to an exemplary embodiment of the present inventive concept.

The speech input unit 110 divides an input first speech into predetermined frames (operation S10).

The speech converting unit 120 converts the frames of the first speech into frames of second speech by applying a conversion rule to each of the frames of the first speech (operation S20). The speech converting unit 120 reflects the frames, which are previously positioned with respect to a frame of the first speech, to the frame of the first speech, and then converts the frame of the first speech into a frame of the second speech. Noise and distortion of the first speech are removed by the speech converting unit 120, so that the first speech is converted into the second speech that is similar to a reference speech for generation of an acoustic model of the speech recognizing apparatus 100.

The recognizing unit 130 of the speech recognizing apparatus 100 recognizes the frames of the second speech and thus identifies a linguistic meaning (operation S30).

The method 300 of FIG. 4 according to an exemplary embodiment may be performed by the speech recognizing apparatuses 100 and 200 of FIGS. 2 and 3 according to the exemplary embodiments as described above, and may include the same technical concept as an operational configuration performed by each element of the speech recognizing apparatuses 100 and 200. Thus, further descriptions, which are the same as the aforementioned contents with reference to FIGS. 2 and 3, will be omitted.

Figure 5:
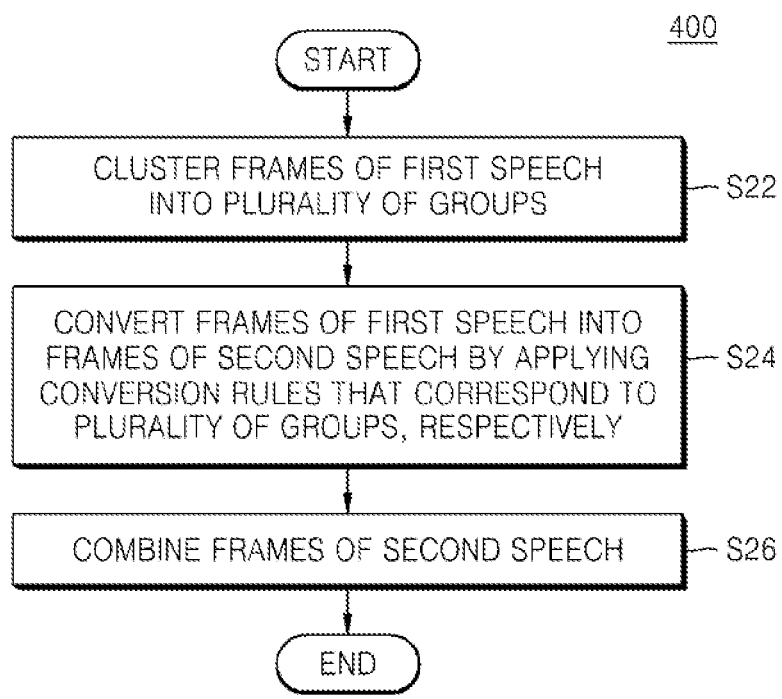
FIG. 5 is a flowchart illustrating in detail operation S20 of FIG. 4, according to another exemplary embodiment.

FIG. 5 is a flowchart illustrating in detail operation S20 of FIG. 4, according to a further exemplary embodiment.

First, the clustering unit 140 clusters the frames of the first speech into a plurality of groups (operation S22). The clustering unit 140 may perform the clustering by using a VQ-based clustering method or a GMM-based clustering method.

The speech converting unit 120 converts the frames of the first speech into the frames of the second speech by applying conversion rules to the frames included in the plurality of groups, wherein the conversion rules correspond to the plurality of groups, respectively (operation S24).

The speech converting unit 120 combines the converted frames of the second speech (operation S26) and thus allows the recognizing unit 130 to recognize the frames of the second speech.

Figure 6:
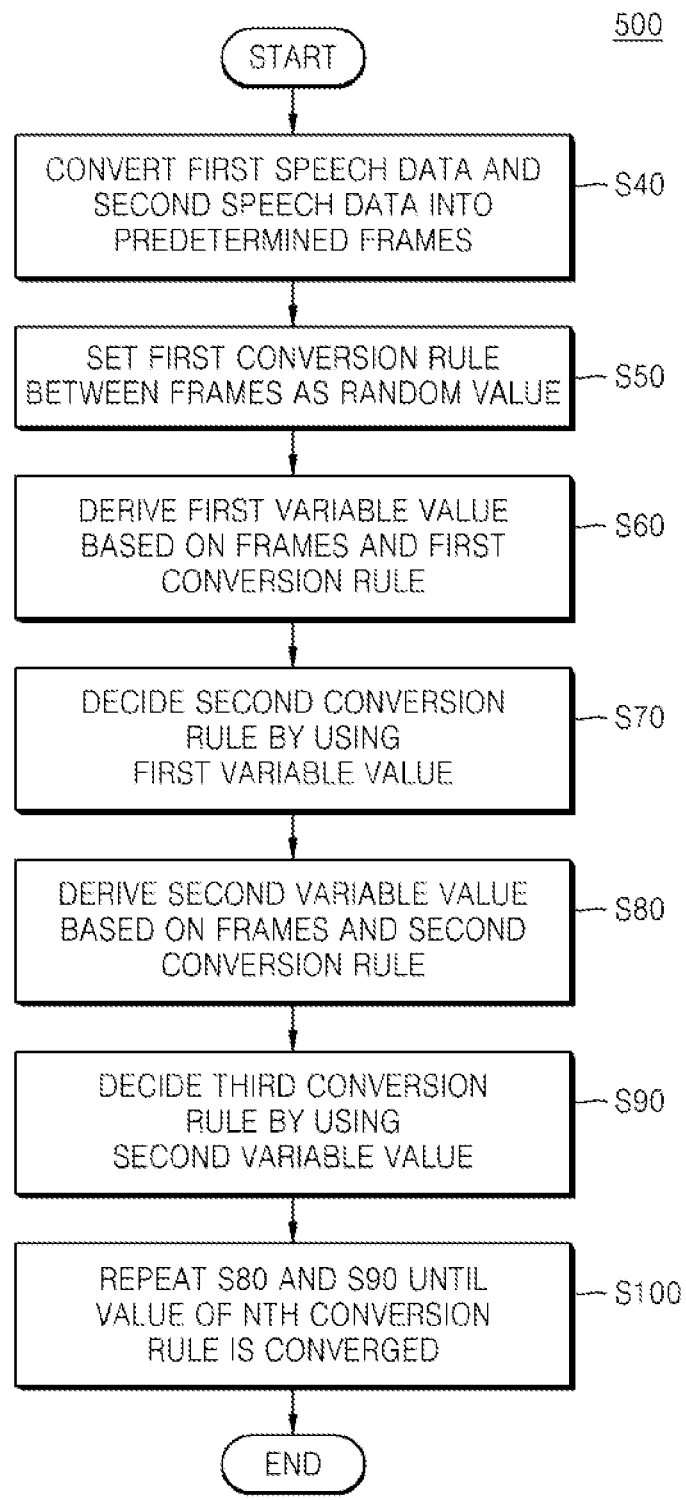
FIG. 6 is a flowchart illustrating a conversion rule deciding flow in a method of recognizing speech, according to another exemplary embodiment.

FIG. 6 is a flowchart illustrating a conversion rule deciding flow in a method of recognizing a speech, according to a further exemplary embodiment.

First, the speech input unit 110 divides first speech data and second speech data into predetermined frames (operation S40).

The conversion rule determining unit 150 sets a first conversion rule as a random value, wherein the first conversion rule indicates a correlation between frames of the first speech data and frames of the second speech data (operation S50).

Based on the first conversion rule and the frames, a first variable value that has an effect on a second conversion rule indicating a correlation between the frames of the first speech data and the frames of the second speech data is derived (operation S60).

Next, the second conversion rule is decided, or determined, by using the first variable value (operation S70).

A second variable value that has an effect on a third conversion rule indicating a correlation between the frames of the first speech data and the frames of the second speech data is derived based on the second conversion rule and the frames (operation S80).

The third conversion rule is decided, or determined, by using the second variable value (operation S90), and operations S80 and S90 are repeated until a value of an nth conversion rule indicating a correlation between the frames of the first speech data and the frames of the second speech data is converged (operation S100). The converged nth conversion rule is determined as a conversion rule between the first speech data and the second speech data.

As described above, the method according to the present exemplary embodiment may involve clustering the divided frames of the first speech into the plurality of groups and may involve applying conversion rules to the plurality of groups, wherein the conversion rules correspond to the plurality of groups, respectively.

In order to decide the conversion rules that correspond to the plurality of groups, respectively, first, the clustering unit 140 clusters the frames of the first speech data and the second speech data into the plurality of groups. Next, the conversion rule determining unit 150 may perform operations S50 through S100 on each of the plurality of groups, and thus may decide the conversion rules that correspond to the plurality of groups, respectively.

In the method according to the present exemplary embodiment as described above, the first and second variable values may be derived by performing Kalman filtering that corresponds to an expectation stage in an EM algorithm. Also, in the method according to the present exemplary embodiment, a method of deciding the second and third conversion rules may correspond to a maximization stage in the EM algorithm and may be performed to maximize the voice recognition likelihood.

Figures 7, 8:
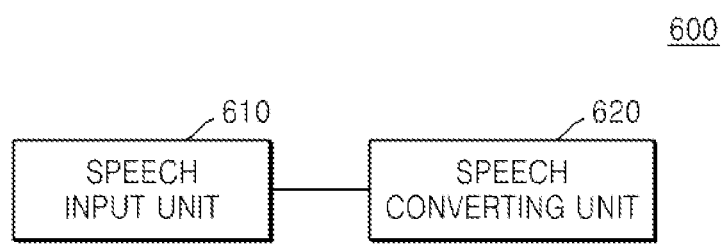
FIG. 7 is a block diagram illustrating a configuration of a front-end processor, according to an exemplary embodiment.
FIG. 8 is a diagram illustrating an effect of the speech recognizing apparatus and method according to exemplary embodiments of the present invention.

FIG. 7 is a block diagram illustrating a configuration of a front-end processor 600, according to an exemplary embodiment according to the present inventive concept.

The front-end processor 600 may include a speech, input unit 610 and a speech converting unit 620.

The speech input unit 610 may receive first speech and may divide the first speech into predetermined frames, and the speech converting unit 620 may convert the frames of the first speech into frames of second speech by applying a conversion rule to each of the divided frames. The converted frames of the second speech may be input to and recognized by a speech recognizing apparatus.

The speech converting unit 620 may reflect at least one frame from among the frames, which are previously positioned with respect to a frame of the first speech, to the frame of the first speech, and then may convert the frame of the first speech into a frame of the second speech.

Detailed functions of the speech input unit 610 and the speech converting unit 620 include the same technical concept as operational configurations performed by the speech input unit 110 and the speech converting unit 120 of each of the speech recognizing apparatuses 100 and 200. Thus, further descriptions, which are the same as the aforementioned contents, will be omitted herein.

Test Example

Tests were performed to increase a recognition rate of a speech recognizing apparatus when an acoustic model, which learned from a speech recorded by using an expensive microphone, was stored in the speech recognizing apparatus.

First, speech recognition was performed by using the speech recognizing apparatus and method according to exemplary embodiments (a first method). In order to compare results, speech recognition was performed with respect to speech that was recorded by using a microphone arranged in the speech recognizing apparatus (a second method), and speech recognition was performed with respect to speech that was recorded by using a microphone used to record a reference speech of the speech recognizing apparatus (a third method).

FIG. 8 is a diagram illustrating results of tests performed by using the speech recognizing apparatus and method according to exemplary embodiments.

When the speech recognition was performed by using the second method, a recognition rate of 85.50% was achieved, and when the speech recognition was performed by using the third method, a recognition rate of 91.03% was achieved.

When the speech recognition was performed by using the first method according to exemplary embodiments, a recognition rate of 90.12% was achieved. When it is assumed that the recognition rate of the third method is an upper limit, the speech recognition by using the first method achieved a performance increase by about 83.54%, and achieved an error decrease by about 31.86%, compared to the second method.

As described above, the speech recognizing apparatus and method using the same according to exemplary embodiments may improve a speech recognition performance, so that speech recognition may be exactly performed. In more detail, when a low-price speech recognizing apparatus recognizes speech, a problem that a speech recognition rate deteriorates due to noise and distortion is solved, so that a speech recognition performance may be improved.

Exemplary embodiments according to the present inventive concept can be written as computer programs and can be implemented in general-use digital computers that execute the programs using a computer readable recording medium.

In particular, while not restricted thereto, an exemplary embodiment can be embodied as computer-readable code stored on a computer-readable recording medium. The computer-readable recording medium may include any data storage device that can store data that can be thereafter read by a computer system. Examples of the computer readable recording medium include magnetic storage media (e.g., read-only memory (ROM), random-access memory (RAM), magnetic tape, floppy disks, hard disks, etc.), and optical recording media (e.g., CD-ROMs, or DVDs). The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, one or more components of the above-described devices may include a processor or microprocessor executing a computer program stored in a computer-readable medium.

While exemplary embodiments of the present inventive concept have been particularly shown and described, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description but by the appended claims, and all differences within the scope will be construed as being included in the present disclosure.

What is claimed is:

1. A method of recognizing speech, the method comprising:
    (a) dividing first speech into frames using a processor, the first speech being input into a speech recognizing apparatus;
    (b) converting the frames of the first speech into frames of second speech by applying at least one conversion rule to each of the divided frames; and
    (c) using the speech recognizing apparatus to recognize the frames of the second speech,
    wherein (b) comprises converting an (n)th frame of the first speech into an (n)th frame of the second speech by reflecting an (n−1)th frame and at least one frame from among frames that are previously positioned with respect to the (n−1)th frame of the first speech,
    wherein n is a natural number.

2. The method of claim 1, wherein each of the frames of the first speech and each of the frames of the second speech comprises at least one feature value indicating a corresponding speech signal included in the respective frame.

3. The method of claim 1, wherein (b) comprises:
    (b-1) clustering the frames of the first speech into a plurality of groups;
    (b-2) converting the frames of the first speech into the frames of the second speech by applying the at least one conversion rule to each of the plurality of groups, wherein each of the at least one conversion rules corresponds to a respective one of the plurality of groups; and
    (b-3) combining the frames of the second speech.

4. The method of claim 3, wherein (b-1) is performed by using one of a Vector Quantization (VQ)-based clustering method or a Gaussian Mixture Model (GMM)-based clustering method.

5. The method of claim 1, wherein the first speech corresponds to a voice recognition likelihood that is less than a voice recognition likelihood corresponding to the second speech.

6. The method of claim 1, wherein each of the at least one conversion rules is determined in a relation between first speech data that is input to the speech recognizing apparatus, and second speech data that corresponds to a voice recognition likelihood greater than a voice recognition likelihood corresponding to the first speech data.

7. A method of recognizing speech, the method comprising:
    (a) dividing first speech into frames using a processor, the first speech being input into a speech recognizing apparatus;
    (b) converting the frames of the first speech into frames of second speech by applying at least one conversion rule to each of the divided frames; and
    (c) using the speech recognizing apparatus to recognize the frames of the second speech,
    wherein (b) comprises converting the frames of the first speech into the frames of the second speech by reflecting at least one frame from among frames that are previously positioned with respect to a frame of the first speech,
    wherein each of the at least one conversion rules is determined in a relation between first speech data that is input to the speech recognizing apparatus, and second speech data that corresponds to a voice recognition likelihood greater than a voice recognition likelihood corresponding to the first speech data,
    the method further comprising (d) determining each of the at least one conversion rules,
    wherein (d) comprises:
    (d-1) dividing the first speech data and the second speech data into the frames;
    (d-2) setting a first conversion rule as a random value, wherein the first conversion rule indicates a correlation between the frames of the first speech data and the frames of the second speech data;
    (d-3) deriving a first variable value that has an effect on a second conversion rule indicating a correlation between the frames of the first speech data and the frames of the second speech data, based on the frames of the first speech data and the second speech data and the first conversion rule;
    (d-4) determining the second conversion rule by using the first variable value;
    (d-5) deriving a second variable value that has an effect on a third conversion rule indicating a correlation between the frames of the first speech data and the frames of the second speech data, based on the frames of the first speech data and the second speech data and the second conversion rule;

(d-6) determining the third conversion rule by using the second variable value; and (d-7) determining the conversion rules by repeating (d-5) and (d-6) until a value of an nth conversion rule indicating a correlation between the frames of the first speech data and the frames of the second speech data is converged.

8. The method of claim 7, further comprising:

(e) clustering the frames of the first speech data and the frames of the second speech data into a plurality of groups; and (f) determining the at least one conversion rule corresponding to each respective one of the plurality of groups, by performing (d-2) through (d-7) on each of the plurality of groups.

9. The method of claim 7, wherein (d-3) and (d-5) are performed via Kalman filtering that corresponds to an expectation stage in an Expectation Maximization (EM) algorithm.

10. The method of claim 7, wherein (d-4) and (d-6) are performed by using a maximization stage in an EM algorithm and are performed to maximize likelihood.

11. A speech recognizing apparatus comprising:
at least one processor executing:
a speech receiver which receives first speech and dividing the first speech into frames;
a speech converter which converts the frames of the first speech into frames of a second speech by applying at least one conversion rule to each of the divided frames; and
a recognizer which recognizes the frames of the second speech,
wherein the speech converter converts an (n)th frame of the first speech into an (n)th frame of the second speech by reflecting an (n−1)th frame and at least one frame from among frames that are previously positioned with respect to the (n−1)th frame of the first speech,
wherein n is a natural number.

12. The speech recognizing apparatus of claim 11, wherein each of the frames of the first speech and each of the frames of the second speech comprises at least one feature value indicating a corresponding speech signal included in the respective frame.

13. The speech recognizing apparatus of claim 11, further comprising an organizer which clusters the frames of the first speech into a plurality of groups,
wherein the speech converter converts the frames of the first speech into the frames of the second speech by applying the at least one conversion rule to each of the plurality of groups, and combines the frames of the second speech, wherein each of the at least one conversion rules corresponds to a respective one of the plurality of groups.

14. The speech recognizing apparatus of claim 13, wherein the organizer clusters the frames of the first speech by using one of a Vector Quantization (VQ)-based clustering method and a Gaussian Mixture Model (GMM)-based clustering method.

15. The speech recognizing apparatus of claim 11, wherein the first speech corresponds to a voice recognition likelihood that is less than a voice recognition likelihood corresponding to the second speech.

16. The speech recognizing apparatus of claim 11, further comprising a conversion rule determiner which determines each of the at least one conversion rules in a relation between first speech data and second speech data that corresponds to a voice recognition likelihood greater than a voice recognition likelihood corresponding to the first speech data.

17. A speech recognizing apparatus comprising:
at least one processor executing:
a speech receiver which receives first speech and dividing the first speech into frames;
a speech converter which converts the frames of the first speech into frames of a second speech by applying at least one conversion rule to each of the divided frames; and
a recognizer which recognizes the frames of the second speech,
wherein the speech converter converts the frames of the first speech into the frames of the second speech by reflecting at least one frame from among frames that are previously positioned with respect to a frame of the first speech,
the speech recognizing apparatus further comprising a conversion rule determiner which determines each of the at least one conversion rules in a relation between first speech data and second speech data that corresponds to a voice recognition likelihood greater than a voice recognition likelihood corresponding to the first speech data,
wherein the conversion rule determiner determines each of the at least one conversion rules by performing (a) dividing the first speech data and the second speech data into the frames;

(b) setting a first conversion rule as a random value, wherein the first conversion rule indicates a correlation between the frames of the first speech data and the frames of the second speech data;

(c) deriving a first variable value that has an effect on a second conversion rule indicating a correlation between the frames of the first speech data and the frames of the second speech data, based on the frames of the first speech data and the second speech data and the first conversion rule;

(d) determining the second conversion rule by using the first variable value;

(e) deriving a second variable value that has an effect on a third conversion rule indicating a correlation between the frames of the first speech data and the frames of the second speech data, based on the frames of the first speech data and the second speech data and the second conversion rule;

(f) determining the third conversion rule by using the second variable value; and (g) determining the conversion rules by repeating (e) and (f) until a value of an nth conversion rule indicating a correlation between the frames of the first speech data and the frames of the second speech data is converged.

18. The speech recognizing apparatus of claim 17, further comprising an organizer which clusters the frames of the first speech data and the frames of the second speech data into a plurality of groups, and
wherein the conversion rule determining unit determines the at least one conversion rule corresponding to each respective one of the plurality of groups, by performing (b) through (g) on each of the plurality of groups.

19. The speech recognizing apparatus of claim 17, wherein (c) and (e) are performed via Kalman filtering that corresponds to an expectation stage in an Expectation Maximization (EM) algorithm.

20. The speech recognizing apparatus of claim 17, wherein (d) and (f) are performed by using a maximization stage in an EM algorithm and are performed to maximize likelihood.

21. A front-end processor for speech recognition, the front-end processor comprising:
at least one processor executing:
a speech receiver which receives first speech and dividing the first speech into frames; and
a speech converter which converts the frames of the first speech into frames of a second speech by applying at least one conversion rule to each of the divided frames,
wherein the speech converter converts an (n)th frame of the first speech into an (n)th frame of the second speech by reflecting an (n−1)th frame and at least one frame from among frames that are previously positioned with respect to the (n−1)th frame of the first speech,
wherein n is a natural number.

22. A method of performing speech recognition, comprising:
receiving first speech spoken by a speaker;
dividing the received first speech into frames using a processor;
converting the received first speech into second speech by applying a predetermined conversion rule to each of the divided frames to generate a corresponding set of second speech frames, and
wherein the converting the received first speech into the second speech includes converting (n)th divided frame into (n)th second speech frame by reflecting (n−1)th frame and at least one frame from among frames that are previously positioned with respect to the (n−1)th frame of the first speech,
wherein n is a natural number; and
recognizing the converted second speech frames.

23. The method of claim 22, wherein the converting the received first speech into second speech further comprises removing at least one of noise and distortion from the received first speech.

24. The method of claim 22, wherein the converting the received first speech into second speech further comprises converting a speech signal of each of the divided frames into a corresponding second speech signal frame.

25. The method of claim 22, wherein the converting the received first speech into second speech further comprises converting a feature vector indicating a feature of a speech signal of each of the divided frames into a corresponding feature vector of a second speech signal frame.

26. A speech recognition apparatus, comprising at least one processor executing:
a speech receiver which receives first speech spoken by a speaker and which divides the received first speech into frames;
a speech converter which converts the received first speech into second speech by applying a predetermined conversion rule to each of the divided frames to generate a corresponding set of second speech frames, and
wherein the converting the received first speech into the second speech includes converting an (n)th divided frame into an (n)th second speech frame by reflecting an (n−1)th frame and at least one frame from among frames that are previously positioned with respect to the (n−1)th frame of the first speech,
wherein n is a natural number; and
a recognizer which recognizes the converted second speech frames.

27. The speech recognition apparatus of claim 26, wherein the speech converter is configured for removing at least one of noise and distortion from the received first speech.

28. The speech recognition apparatus of claim 26, wherein the speech converter is configured for converting a speech signal of each of the divided frames into a corresponding second speech signal frame.

29. The speech recognition apparatus of claim 26, wherein the speech converter is configured for converting a feature vector indicating a feature of a speech signal of each of the divided frames into a corresponding feature vector of a second speech signal frame.

30. A non-transitory computer readable recording medium having recorded thereon a program executable by a computer for performing the method of claim 1.

\* \* \* \* \*